(12) United States Patent
De Buhr

(10) Patent No.: US 7,934,753 B2
(45) Date of Patent: May 3, 2011

(54) AIRCRAFT WITH CONNECTION ELEMENT FOR CONNECTING A CONDUIT SYSTEM TO COOLING AGGREGATES IN AIRCRAFT CABINS

(75) Inventor: Theo De Buhr, Leer (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 12/472,221

(22) Filed: May 26, 2009

(65) Prior Publication Data

US 2009/0283641 A1 Nov. 19, 2009

Related U.S. Application Data

(62) Division of application No. 11/123,910, filed on May 6, 2005, now abandoned.

(60) Provisional application No. 60/606,648, filed on Sep. 2, 2004.

(30) Foreign Application Priority Data

May 7, 2004 (DE) .......................... 10 2004 023 242

(51) Int. Cl.
  *F16L 5/00* (2006.01)
(52) U.S. Cl. ..................................... 285/142.1; 244/131
(58) Field of Classification Search ............... 285/141.1, 285/142.1, 143.1, 190; 244/131
  See application file for complete search history.

(56) References Cited

U.S. PATENT DOCUMENTS

| 205,123 | A | | 6/1878 | Müller | |
|---|---|---|---|---|---|
| 506,842 | A | | 10/1893 | Burke | |
| 1,026,632 | A | * | 5/1912 | Mueller | 285/46 |
| 1,471,154 | A | | 10/1923 | Graham | |
| 2,410,999 | A | | 11/1946 | Reisner | |
| 2,438,412 | A | * | 3/1948 | Morris | 174/153 R |
| 2,441,009 | A | | 5/1948 | Cunningham | |
| 2,463,405 | A | * | 3/1949 | McMaster | 285/64 |
| 2,672,500 | A | * | 3/1954 | Bondon | 174/153 R |
| 2,795,798 | A | | 6/1957 | Boggess | |
| 2,813,692 | A | * | 11/1957 | Peterson et al. | 248/56 |
| 2,835,305 | A | * | 5/1958 | Boyer | 152/427 |
| 3,190,332 | A | * | 6/1965 | Bernard | 383/96 |
| 3,224,796 | A | * | 12/1965 | Burkitt | 285/149.1 |

(Continued)

FOREIGN PATENT DOCUMENTS

DE   25 56 878 A1   6/1977

(Continued)

*Primary Examiner* — David E Bochna
(74) *Attorney, Agent, or Firm* — Ostrolenk Faber LLP

(57) ABSTRACT

An aircraft having a connection element for connecting at least one first conduit element or the like positioned in a supply chamber of an aircraft with at least one second conduit element positioned in a cabin chamber of the aircraft, where the supply chamber and cabin chamber are separated from each other by a separation element, substantially comprising a connection part comprising fastening elements for fastening the first and second conduit element. Known connection elements have the disadvantage that there occur sealing problems due to the fastening of the fastening element at the outside of the connection part at the end facing the cabin chamber. A further disadvantage is that the connection elements protrude into the cabin chamber and form edges over which one may stumble there. In that at least the fastening element for the fastening the conduit element of the cabin chamber is provided within the connection part, there may be realized a compact structural shape which does not protrude from the separating element into the cabin chamber, and which may in addition be reliably sealed.

13 Claims, 7 Drawing Sheets

U.S. PATENT DOCUMENTS

| | | | | |
|---|---|---|---|---|
| 3,540,065 A | | 11/1970 | Gidner | |
| 3,545,793 A | * | 12/1970 | Graffy | 285/142.1 |
| 3,548,079 A | * | 12/1970 | Wold et al. | 174/153 G |
| 3,572,775 A | * | 3/1971 | Bloom et al. | 285/288.7 |
| 3,749,424 A | * | 7/1973 | Greene | 285/139.1 |
| 4,509,460 A | * | 4/1985 | Seltzer | 119/74 |
| 4,538,020 A | * | 8/1985 | Tucker | 174/138 E |
| 4,553,561 A | | 11/1985 | Morris | 137/362 |
| 4,561,134 A | * | 12/1985 | Mathews et al. | 4/496 |
| 4,828,296 A | * | 5/1989 | Medvick | 285/139.1 |
| 4,928,997 A | | 5/1990 | Reisener | 285/13 |
| 5,129,684 A | * | 7/1992 | Lawrence et al. | 285/288.1 |
| 5,406,032 A | * | 4/1995 | Clayton et al. | 174/151 |
| 5,456,499 A | * | 10/1995 | Sharpe | 285/39 |
| 5,664,810 A | * | 9/1997 | Zielinski | 285/152.1 |
| 5,831,217 A | * | 11/1998 | Jarvis et al. | 174/153 R |
| 5,951,059 A | * | 9/1999 | Kitamura | 285/24 |
| 5,988,699 A | | 11/1999 | Quandt | 285/142.1 |
| 6,612,620 B1 | | 9/2003 | Nordstrom | 285/139.1 |
| 7,448,652 B2 | * | 11/2008 | Poast et al. | 285/136.1 |

FOREIGN PATENT DOCUMENTS

| | | |
|---|---|---|
| DE | 3912479 C1 | 7/1990 |
| DE | 202 01 112 U1 | 8/2003 |
| DE | 102 33 127 C1 | 12/2003 |
| EP | 1 484 544 A1 | 6/2003 |

* cited by examiner

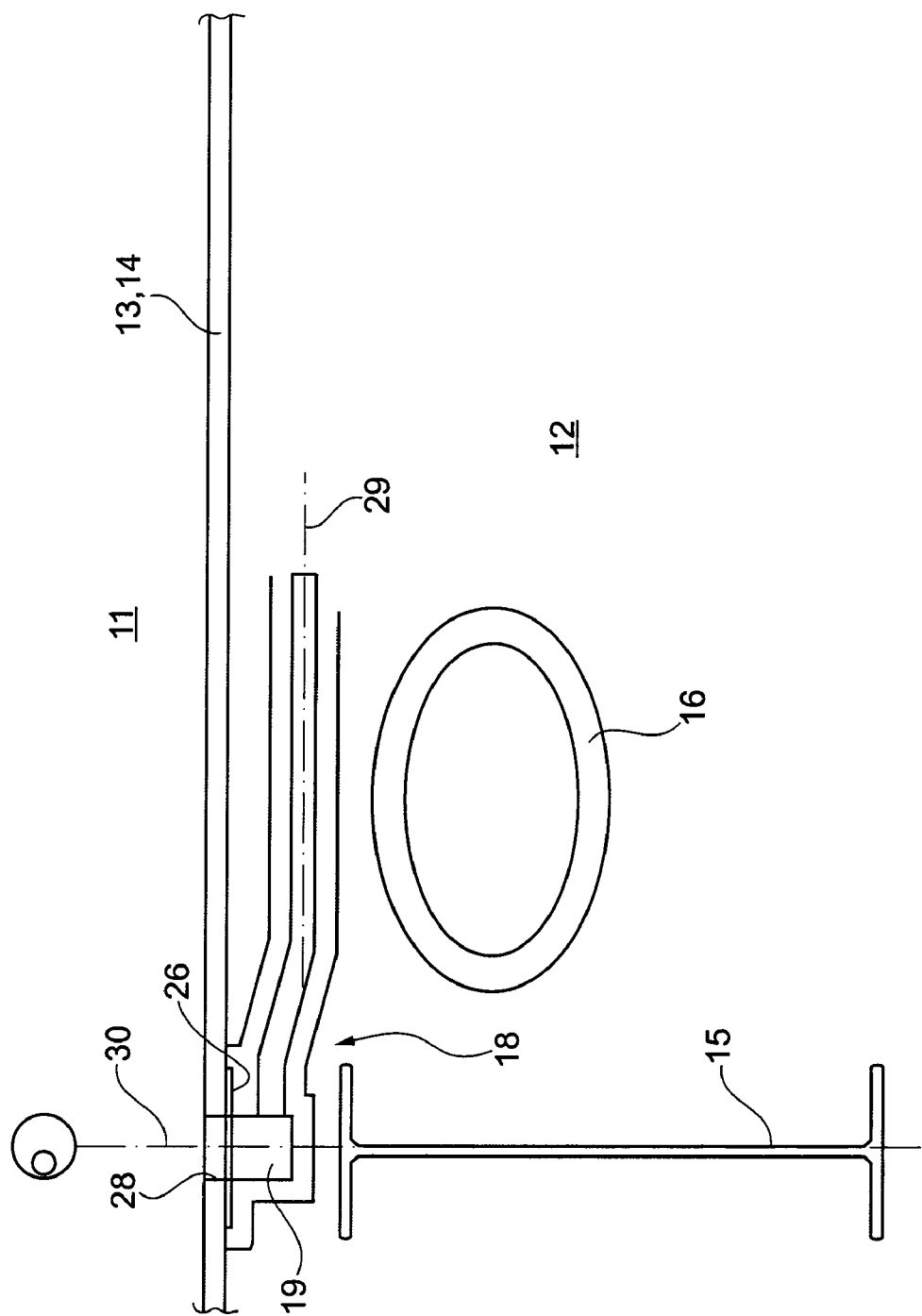

AIRCRAFT WITH CONNECTION ELEMENT FOR CONNECTING A CONDUIT SYSTEM TO COOLING AGGREGATES IN AIRCRAFT CABINS

CROSS REFERENCE TO RELATED APPLICATIONS

This is a divisional of U.S. patent application Ser. No. 11/123,910, filed May 6, 2005 in the name of Theo De Buhr and entitled CONNECTING ELEMENT FOR CONNECTING A CONDUIT SYSTEM TO COOLING AGGREGATES IN AIRCRAFT CABINS, the disclosure of which is incorporated by reference herein.

FIELD OF THE INVENTION

The invention relates to an aircraft with a connection element for connecting a first conduit element or the like positioned in a supply chamber of the aircraft with at least one second conduit element positioned in a cabin chamber of the aircraft, wherein supply chamber and cabin chamber are separated from each other by means of a separation part, substantially comprising a connection part comprising fastening element for fastening the first and second conduit elements.

TECHNICAL BACKGROUND

Connection elements of this kind are especially employed in aircraft construction. Aircraft usually have a cabin chamber in which at regular intervals so called center regions are provided. In these center regions there are provided kitchens, among others with separate cooling aggregates. In order to be flexible with respect to the position of the individual aggregates within the center region for creating so called flex-zones, there are usually provided several connections at which the or each aggregate may be adapted. For supplying the aggregates with the necessary supply lines or offtake lines for the cooling medium or the like which are commonly situated below the bottom plate of the cabin in so called supply chambers, connection elements are necessary which secure the bottom feed-through, namely the connection between a conduit element in the supply chamber to a conduit element in the cabin chamber. As conduit elements, there are understood all tube elements, hose elements, tube-hose elements or connection elements of other kinds. Besides the conduits for supply and leading-out of, for example, cooling element in the cabin region, below the bottom plate in the supply chamber there are also further conduit elements, for example the main conduit for the air conditioner, as well as cross beams and other members.

The known connection elements have a tubular connection part which at least partly extends into the cabin chamber through the separation element. At the section of the connection part extending into the cabin chamber, at the outer side thereof is disposed a connection element corresponding to respective fastening element at the conduit element. Usually, the connection part is provided with an outer thread onto which the conduit element of the cabin chamber is screwed.

On the one hand, this has the disadvantage that a big structural shape is necessary, namely particularly a big installation height. Thereby, an installation above cross beams or main conduits for the air conditioner in the supply chamber is not possible. On the other hand, due to the excess length with respect to the bottom plate, the connection elements form an abutting edge, which presents a stumbling danger in the cabin chamber and complicates the mounting of a kitchen as well as the change of position of individual aggregates. Moreover, the known connection elements have a sealing difficulty. By means of the outer thread of the connection element, a sealing with respect to humidity is not secured between the cabin chamber and the supply chamber (upper deck or lower deck). A further disadvantage is that the known connection elements require a very big insection in the bottom plate, which makes necessary a strengthening of the surrounding bottom plate.

SUMMARY OF THE INVENTION

There may be a need to provide an aircraft with a compact connection element.

According to an exemplary embodiment of the invention, an aircraft with a connection element of the above mentioned kind may be provided in that at least one fastening element for the fastening of the conduit element of the cabin chamber may be provided within the connection part. Thereby, on the one hand, may be effected that the connection part ends up with the separation part in a maximally flush manner. In other words, the connection element does not protrude from the separation element, so that a plane surface without edges over which one may stumble or the like may be ensured. Moreover, for example for pressure test purposes, the connection element may be provided with blind plug(s), that also do not protrude from the separation element into the cabin chamber. On the other hand, the connection elements according to an exemplary embodiment of the invention, due to their construction, may be sufficiently compact that only a small installation height may be necessary which may also allow for an installation above cross beams, air conditioner conduits or other construction elements within the supply chamber and below the separation element. Further, the exemplary embodiment of the invention may allow for a simple and reliable sealing between the upper deck and the lower deck.

According to an exemplary embodiment of the invention, a compact connection element may be provided which may allow for a secure and reliable feed-through of conduit elements via a separation element, and at the same time may be handled in an easy and comfortable manner.

For example, the connection part may have an inner thread at the side facing the cabin chamber. Thereby, a particularly tight, flexible and easily manageable fastening of the conduit element of the cabin chamber may be possible. Due to the only small opening in the bottom plate, a strengthening of the bottom plate may be omitted.

In an exemplary embodiment of the invention, a flange element may be assigned to the connection part, wherein the flange element may be disposed with respect to the free end facing the cabin chamber in a standing-back manner. Thereby, on the one hand, a simple and fast mounting may be ensured. On the other hand, by means of the flange element, an optimal sealing possibility for sealing with respect to humidity may be created between the upper deck and the lower deck.

For example, there may be a tube part assigned to the connection part at the side opposite to the free end, wherein the tube part may be fixedly connected to the connection element, and may be selectively provided straight or bent. This may also allow for the installation between the separation element on the one hand, and cross beams, conduits or other members within the supply chamber on the other hand, so that the flex-zones of the center regions may be provided in any zones within the cabin chamber, which element may be provided also above cross beams, traverse conduits or the like.

Further exemplary features and embodiments result from the dependent claims and the description. Exemplary embodiments are further explained with reference to the accompanying drawing.

BRIEF DESCRIPTION OF THE DRAWINGS

FIG. 3 is a schematic representation of a connection element having an angled tube portion.

DETAILED DESCRIPTION OF EXEMPLARY EMBODIMENT

The connection elements shown in the figures serve as bottom feed-through connecting two conduit elements like, for example, tube elements, hose elements or socket elements with each other via a bottom plate.

Figure 1:
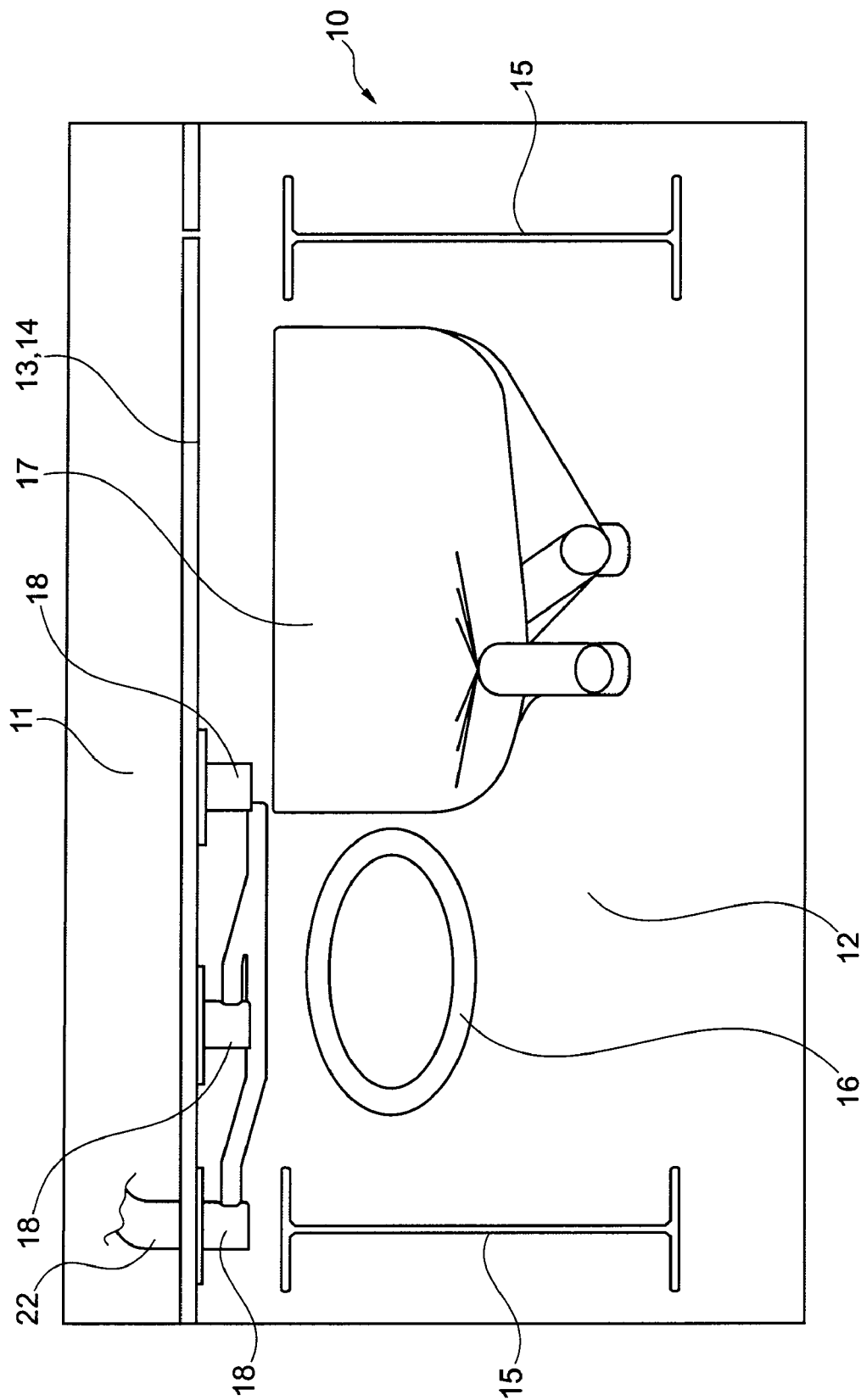
FIG. 1 is a schematic representation of a portion of an aircraft body having a cabin chamber and a supply chamber.

In FIG. 1, a section of a body 10 of an aircraft is schematically shown. Within the body 10, at least one cabin chamber 11 as well as at least one supply chamber 12 are provided. The cabin chamber 11 is separated or disjoined, respectively, from the supply chamber 12 by means of a separation element 13 which is provided as a bottom plate 14. Within the supply chamber 12, there are disposed different components, like, for example, crossbeams 15, traverse conduits 16 for supply of the air conditioner, as well as further conduit elements 17 serving, for example, for supplying cooling aggregates in the cabin chamber. For feeding through at least one conduit element 17 through the bottom plate 14, there is provided at least one connection element 18.

Figure 2:
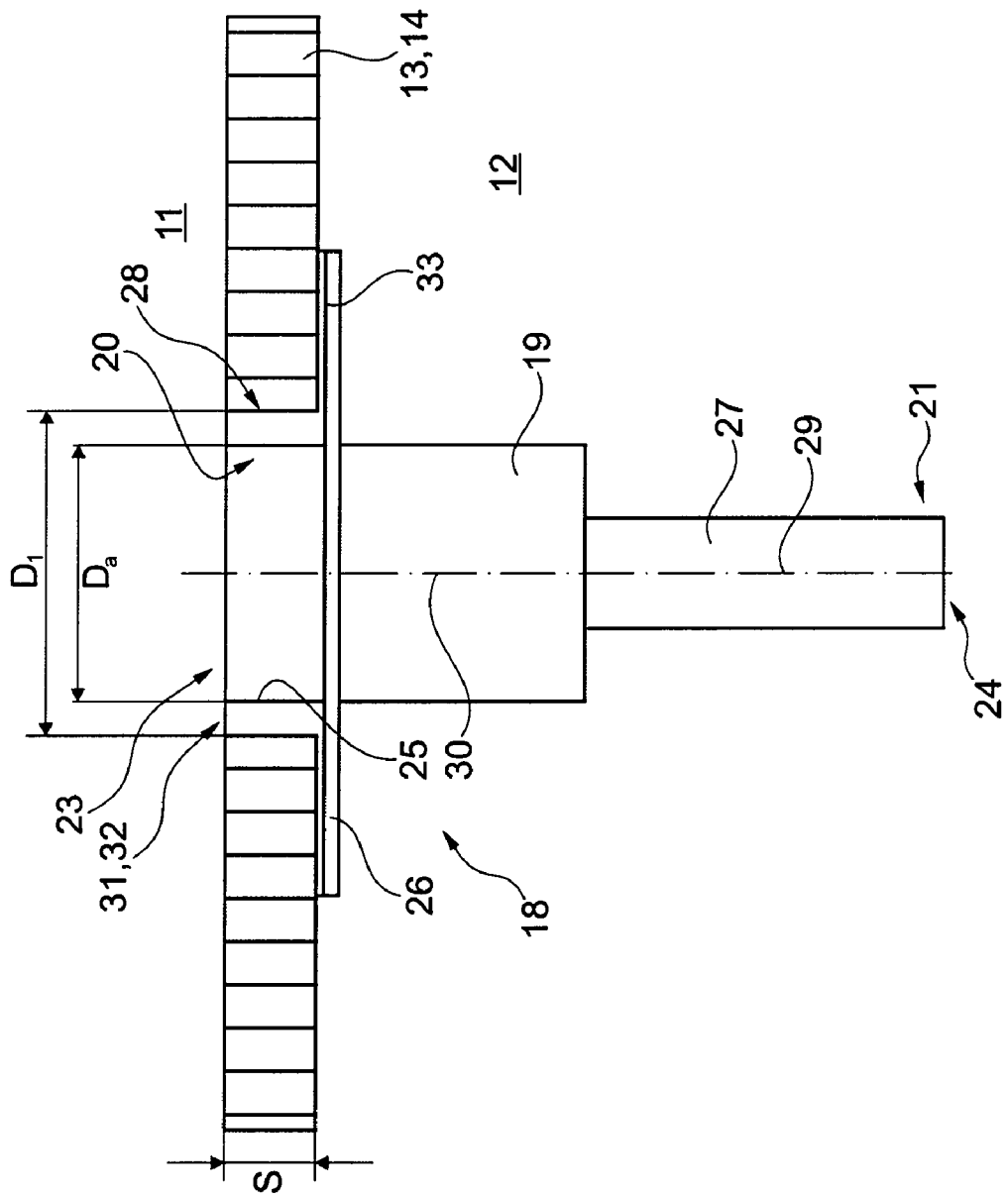
FIG. 2 is a schematic representation of a connection element having a straight tube portion.
Figure 4A:
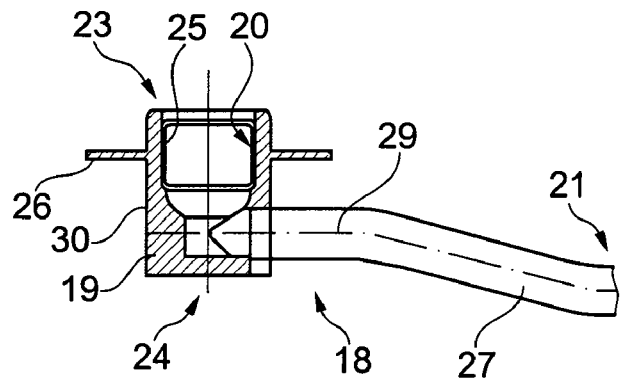
FIG. 4a is a partially sectional side view of a connection element having an angled tube portion.
Figure 4B:
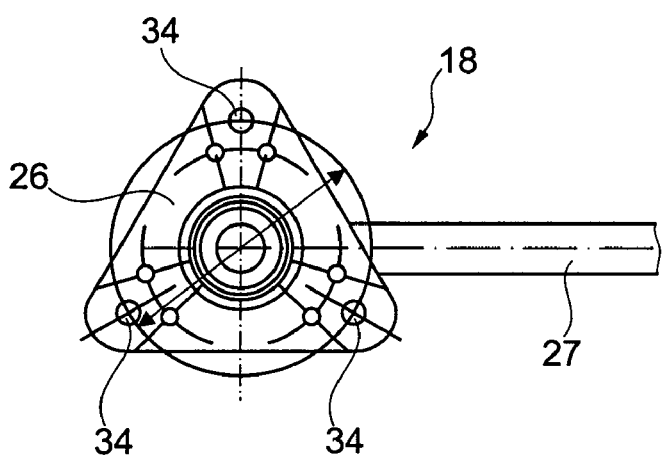
FIG. 4b is a plan view of the connection element according to FIG. 4a, FIG. 5a is a partially sectional side view of a connection element having a straight tube portion.
Figure 5A:
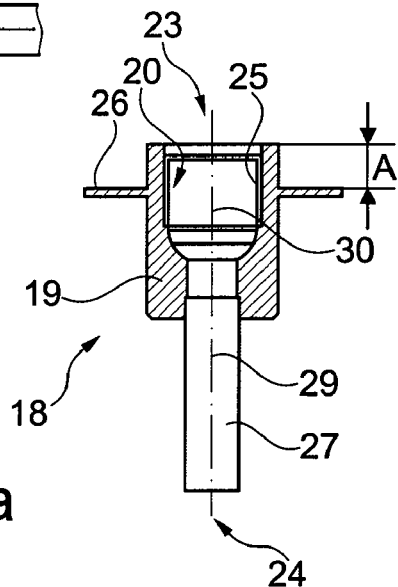
FIG. 5b is a plan view of the connection element according to FIG. 5a, FIG. 6 is a perspective view of a connection element with parts of a bottom plate.

FIG. 2 illustrates a first embodiment of the connection element 18. The connection element 18 comprises substantially a connection part 19 having fastening elements 20, 21 for the conduit element 17 of the supply chamber 12 as well as for a conduit element 22 of the cabin chamber 11. The connection part 19 is provided in a cylindrical shape and a tube-like form. Other shapes, particularly also weight reducing ones, which may be obtained, for example by outer material decrease, are also possible. A free end 23 of the connection part 19 faces the cabin chamber 11, and serves for fastening the conduit element 22 of the cabin chamber 11. Opposite to the free end 23, the end 24 of the connection part 19, or, respectively, of a tube part 27 being disposed therein (for example in a bore), faces the supply chamber 12 and serves for fastening the conduit element 17. In the region of the free end 23, the connection part 19 has, at the inner side thereof, the fastening element 20. In the shown embodiment, the connection part 19 is provided with an inner thread 25 (see for example FIGS. 4a and 5a). Alternatively, the fastening element 20 may, for example, be designed as bayonet coupling, snap fit or plug-type lock or the like, wherein all connection elements are disposed inside. The fastening element 21 at the free end 24 of the tube part 27 which is, for example by soldering or welding, fixedly fastened to the connection part 19 may be provided as thread connection, crimp connection, solder connection or welding connection or as another common sealing element and/or fastening element.

Further, the connection part 19 corresponds to a flange element 26. The preferably triangularly provided flange element 26 is fixedly fastened to the connection part 19. The position of the flange element 26 is variable.

Preferably, the flange element 26 is provided revolving about the connection part 19 and is disposed at a distance A to the free end 23. The distance A corresponds to approximately the thickness S of the bottom plate 14. Preferably, the distance A is slightly smaller than the strength S of the bottom plate 14.

The bottom plate 14 has at least one opening 28 for receiving the connection part 19. The opening 28 has a diameter $D_1$ which corresponds to at least the outer diameter $D_a$ of the connection part 19 at the free end 23. Preferably, the diameter $D_1$ is slightly larger than the outer diameter $D_a$. However, the diameter $D_1$ is selected in such a way that the flange element 26 at least partly covers the opening 28. For being fastened at the bottom plate 14, the flange element 26 has several, preferably three, bores 34. Alternatively, there may also be provided rivetted-on nuts or similar elements.

Figure 5B:
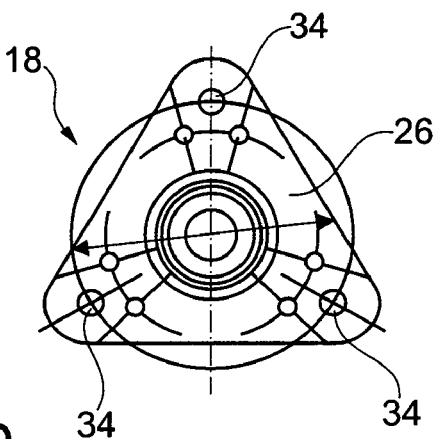
Figure 6:
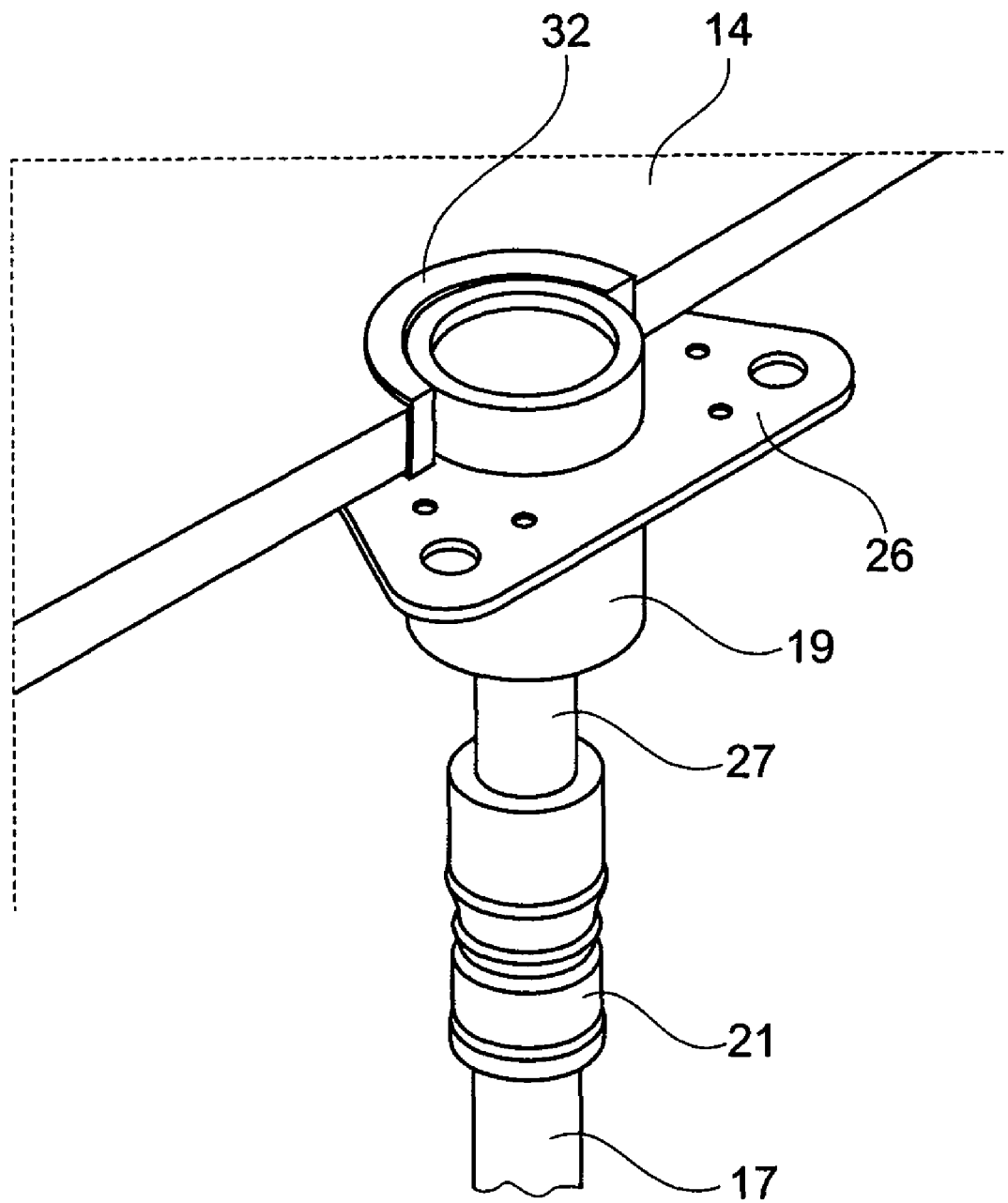

The tube part 27 protruding into the supply chamber 12 may be provided or shaped, respectively, in different forms, and be disposed at different positions at the connection part 19. Especially in the FIGS. 2 and 5a, 5b, a straight provision and arrangement of the tube part 27 is shown. Therein, the tube part 27 is shaped cylindrically. The middle axis 29 of the tube part 27 proceeds parallel to the middle axis 30 of the connection part 19 or is congruent therewith, respectively. This especially simple construction shape is advantageous, if there are no disturbing components disposed in the supply chamber 12 in the region of the opening 28. In case that in the supply chamber 12 in the region of the opening 28, there are disposed components, like for example crossbeams 15 or the traverse conduit 16 (as shown in FIG. 3), to the one hand, the tube part 27 is provided in bent form. To the other hand, the tube part 27 is further disposed at an angle with respect to the connection part 19, so that the middle axes 29, 30 proceed at an angle with respect to one another.

In the mounted state of the connection element 18, that is to say when the connection element 18, for example by means of screws, is connected to the bottom plate 14 in a detachable manner, between the connection part 19 and the bottom plate 14, due to the diameter difference $D_1$-$D_a$, there is formed an interspace 31 or also a hole-shaped split which is filled with a fill material 32. The fill material 32 may also have a sealing effect or sealing features, respectively.

Between the flange element 26 and the bottom plate 14, there is sandwiched a seal element 33 which especially ensures the humidity sealing between upper deck and lower deck. As sealing materials, there may be used all commercially available as well as special sealing manners.

Figure 7:
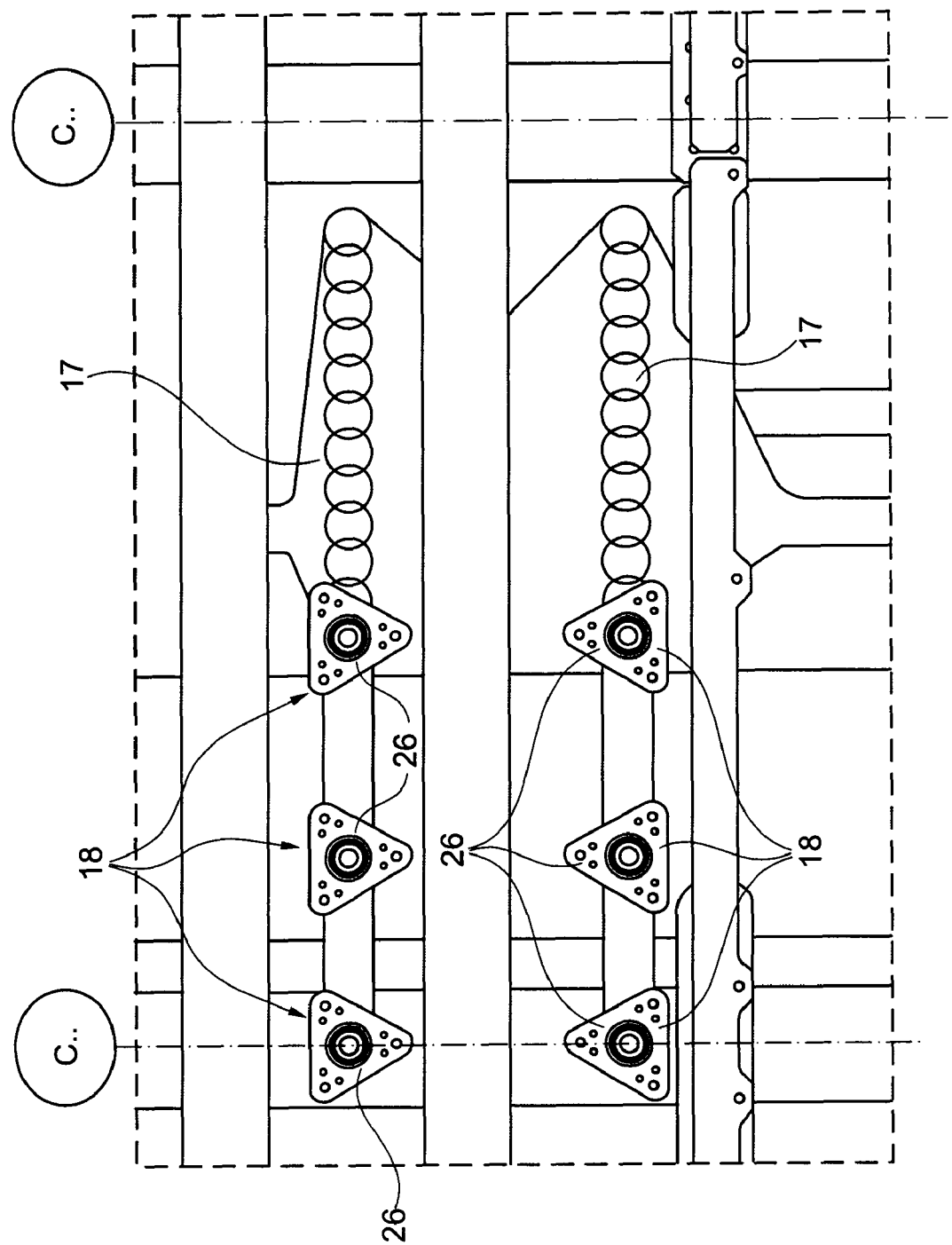
FIG. 7 is a plan view of several adjacently disposed connection elements in a built-in state.
Figure 8:
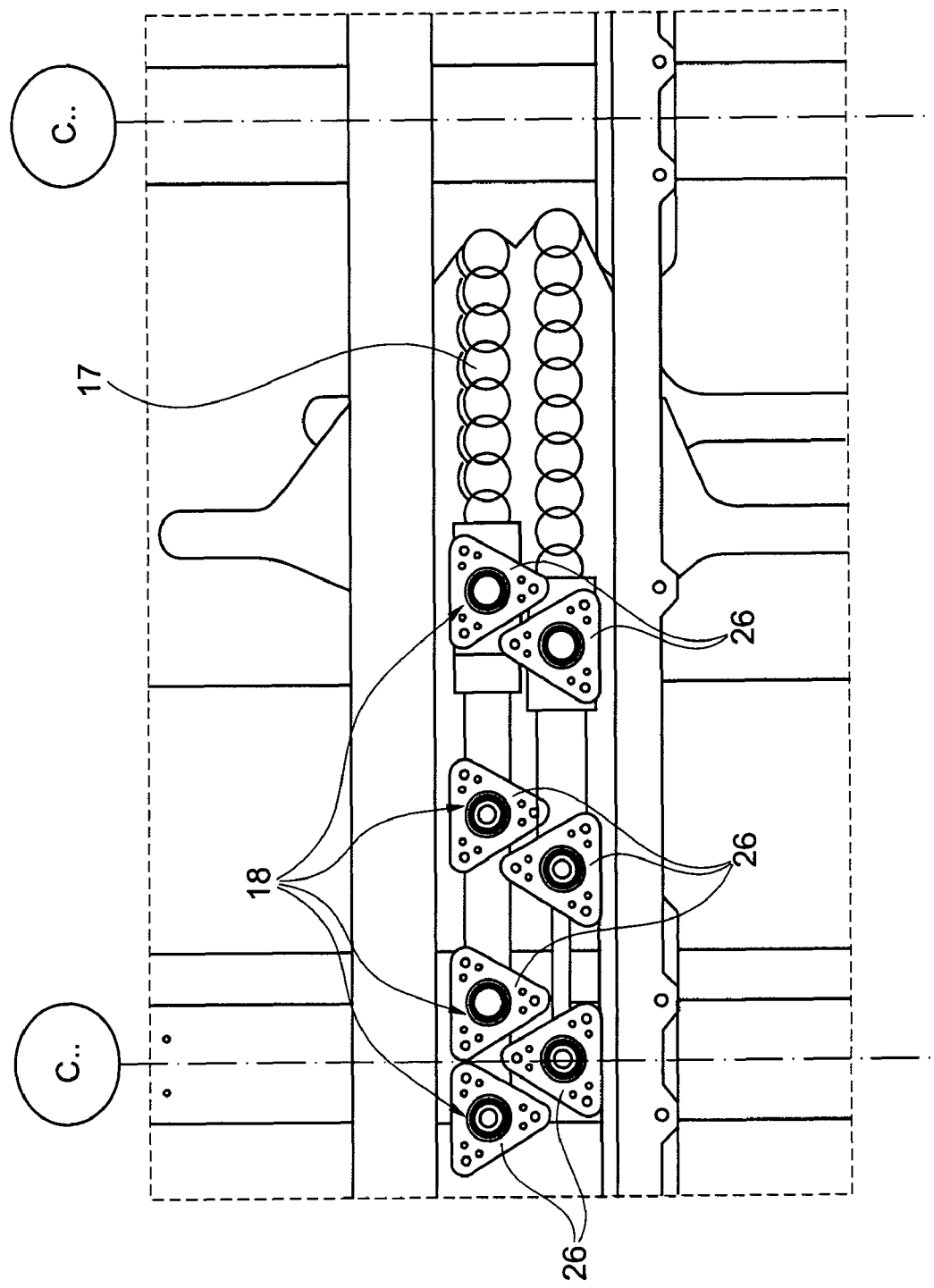
FIG. 8 is a plan view of several connection elements disposed in a built-in state in a nested manner with respect to each other.

Several ones of the of connection elements 18 may be disposed side by side at the bottom plate 14 (see for example FIG. 7), for example for realising a supply line and an offtake line to the central region C. In an especially space-saving variant, the triangular flange elements 26 are disposed nested to each other (see for example FIG. 8), so that several bottom feed-throughs may be provided in smallest space. For avoiding mixing-ups or interchanges, for example in connection with the supply line or offtake line, the fastening element 21 of adjacently disposed connection parts 19 may be provided with different embodiments. One possibility is, for example, the provision of a left-handed threading for the connection part 19 of the supply line and a right-handed thread for the connection part 19 of the offtake line. It is also possible to use differing kinds of threads or coloured labelling.

The connection part 19 may of course be adapted for feed-through of conduit-elements or other separation elements like side walls or the like.

It should be noted that the term "comprising" does not exclude other elements or steps and the "a" or "an" does not exclude a plurality. Also elements described in association with different embodiments may be combined.

It should also be noted that reference signs shall not be construed as limiting the scope of the claims.

What is claimed is:

1. An aircraft comprising:
a supply chamber; and
a cabin chamber,
at least one first conduit element positioned in the supply chamber and at least one second conduit element positioned in the cabin chamber,
a separation element separating the supply chamber and the cabin chamber from each other;
a connection element at the separation element and connecting the at least one first conduit element to the at least one second conduit element,
wherein the connection element comprises
a connection part which comprises a fastening element fastening together the first and second conduit elements, the fastening element is a plug-type lock and/or a snap lock configured for fastening the second conduit at the fastening element,
wherein at least the fastening element is configured for fastening the at least one second conduit element of the cabin chamber within the connection part and wherein the connection element at the separation element is configured to not protrude from the separation element into the cabin chamber.

2. The aircraft according to claim 1, wherein the separation element comprises a bottom plate at the bottom of the cabin chamber, the bottom plate having at least one opening into which the connection element extends.

3. The aircraft according to claim 1, wherein the connection part is cylindrical or tubular.

4. The aircraft according to claim 1, wherein the connection part has an inner thread configured for fastening the second conduit at the connection part.

5. The aircraft according to claim 1, further comprising an interspace formed between the connection part and the separation element, by the difference between the diameters thereof, and a fill material disposed in the interspace.

6. The aircraft according to claim 1, wherein the connection part comprises a tube part at the side facing the supply chamber and the tube part is fixedly connected to the connection part.

7. The aircraft according to claim 6, wherein the fastening element for the conduit element in the supply chamber is disposed at the tube part.

8. The aircraft according to claim 6, wherein the tube part is selectively provided straight or bent.

9. The aircraft according to claim 6, wherein each of the connection part and the tube part has a middle axis, and the middle axis of the tube part selectively extends parallel to or at an angle to the middle axis of the connection part.

10. An aircraft comprising:
a supply chamber; and
a cabin chamber,
at least one first conduit element positioned in the supply chamber and at least one second conduit element positioned in the cabin chamber,
a separation element separating the supply chamber and the cabin chamber from each other;
a connection element at the separation element and connecting the at least one first conduit element to the at least one second conduit element,
wherein the connection element comprises
a connection part which comprises a fastening element fastening together the first and second conduit elements;
wherein the at least the fastening element is configured for fastening the at least one second conduit element of the cabin chamber within the connection part and wherein the connection element at the separation element is configured to not protrude from the separation element into the cabin chamber;
wherein the connection part includes a free end and a region at the free end, the separation element has an opening which receives the free end of the connection part, and an and outer diameter of the connection part in the region of the free end is slightly smaller than a diameter of the opening in the separation element; and
a tube part, positioned at a side facing an end of the connection part, wherein the tube part is fixedly connected to the connection part, and wherein a middle axis of the tube part extends at an angle to a middle axis of the connection part.

11. An aircraft comprising:
a supply chamber; and
a cabin chamber,
at least one first conduit element positioned in the supply chamber and at least one second conduit element positioned in the cabin chamber,
a separation element separating the supply chamber and the cabin chamber from each other;
a connection element at the separation element and connecting the at least one first conduit element to the at least one second conduit element,
wherein the connection element comprises
a connection part which comprises a fastening element fastening together the first and second conduit elements,
wherein at least the fastening element is configured for fastening the at least one second conduit element of the cabin chamber within the connection part and wherein the connection element at the separation element is configured to not protrude from the separation element into the cabin chamber,
the connection part further comprises a flange element, and with respect to the free end of the connection part which faces the cabin chamber, the flange element is disposed in a stand-off manner; wherein the separation element comprises a bottom plate of the cabin chamber; the flange element is triangularly shaped, and a seal element is disposed between the flange element and the bottom plate.

12. The aircraft according to claim 11, wherein the flange element is connected to the bottom plate in a detachable manner.

13. The aircraft according to claim 11, wherein the flange element is connected to the bottom plate by a plurality of screws.

* * * * *